(12) United States Patent
Huras et al.

(10) Patent No.: US 6,807,540 B2
(45) Date of Patent: Oct. 19, 2004

(54) SYSTEM AND METHOD FOR DEADLOCK MANAGEMENT IN DATABASE SYSTEMS WITH DEMULTIPLEXED CONNECTIONS

(75) Inventors: Matthew A. Huras, Ajax (CA); Sean W. McKeough, Markham (CA); Timothy J. Vincent, Toronto (CA); Xun Xue, Scarborough (CA); Roger L. Zheng, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 09/872,831

(22) Filed: May 31, 2001

(65) Prior Publication Data

US 2002/0042850 A1 Apr. 11, 2002

(30) Foreign Application Priority Data

Oct. 6, 2000  (CA) ............................................. 2322604

(51) Int. Cl.[7] ............................................. G06F 17/30
(52) U.S. Cl. .................. 707/8; 707/104.1; 719/317; 710/200; 709/202; 718/102
(58) Field of Search ................. 707/8, 104.1; 719/317; 710/200; 709/202; 718/102

(56) References Cited

U.S. PATENT DOCUMENTS

| | | | | |
|---|---|---|---|---|
| 5,095,421 A | | 3/1992 | Freund | 364/222.81 |
| 5,280,619 A | * | 1/1994 | Wang | 710/200 |
| 5,459,871 A | * | 10/1995 | Van Den Berg | 718/104 |
| 5,764,976 A | * | 6/1998 | Hsiao | 707/8 |
| 5,835,766 A | * | 11/1998 | Iba et al. | 709/104 |
| 5,845,117 A | * | 12/1998 | Fujita | 709/107 |
| 5,940,828 A | * | 8/1999 | Anaya et al. | 707/8 |
| 5,983,225 A | * | 11/1999 | Anfindsen | 707/8 |
| 6,041,384 A | * | 3/2000 | Waddington et al. | 710/200 |
| 6,065,039 A | * | 5/2000 | Paciorek | 709/202 |
| 6,263,358 B1 | * | 7/2001 | Lee et al. | 718/100 |
| 6,289,343 B1 | * | 9/2001 | Freund et al. | 707/8 |
| 6,292,830 B1 | * | 9/2001 | Taylor et al. | 709/224 |
| 6,334,141 B1 | * | 12/2001 | Varma et al. | 709/205 |
| 6,343,339 B1 | * | 1/2002 | Daynes | 710/200 |
| 6,546,412 B1 | * | 4/2003 | Kim et al. | 718/104 |
| 6,609,178 B1 | * | 8/2003 | Ofer | 711/152 |
| 2002/0173986 A1 | * | 11/2002 | Lehew et al. | 705/1 |

* cited by examiner

*Primary Examiner*—Jean R. Homere
*Assistant Examiner*—Leslie Wong
(74) *Attorney, Agent, or Firm*—Sawyer Law Group LLP

(57) ABSTRACT

A system and method for managing deadlocks in a database management system (DBMS) for a demultiplexed database system. The DBMS supports applications that are capable of holding and retaining locks on database resources while disassociated from worker agents. The system and method includes an application scheduler for managing requests for access to the database, and a deadlock detector for identifying a deadlock. The application scheduler assigns one worker agent to an application requesting access to a database resource, assigns a flag to an application holding a lock on the database resource while disassociated from a worker agent, and in cooperation with the deadlock detector, resolves the deadlock between the application requesting access and the flagged application holding the lock.

31 Claims, 5 Drawing Sheets

SYSTEM AND METHOD FOR DEADLOCK MANAGEMENT IN DATABASE SYSTEMS WITH DEMULTIPLEXED CONNECTIONS

FIELD OF THE INVENTION

The present invention is directed to an improvement in computing systems and in particular to computer systems for managing deadlocks in demultiplexed connection database management system environments.

BACKGROUND OF THE INVENTION

In database management systems (DBMSs) it is possible to provide concurrent connections to a database by using demultiplexed connection environments. In such DBMSs, worker agents carry out processes in response to requests made by applications (or clients). Often agents are associated with applications by an application scheduler or manager for the life of a transaction. To handle the potentially large number of inbound connections being demultiplexed across a smaller number of worker agents, DBMSs use schedulers and wait queues.

In DBMSs such as relational DBMSs, applications are able to obtain locks on portions of a database. A row, a page or a table, for example, may be locked by an application, depending on the operation that the application is carrying out on the database in an RDBMS. Typically such locks are held on data representations in the DBMS but more generally are considered to be locks on database resources. Where locks are held and other applications seek to obtain locks, deadlocks may occur. In the prior art, such deadlocks may be detected by a deadlock detector in the DBMS. The deadlock detector may identify an application that will be required to release a held lock to break the deadlock.

Prior art systems have been developed to detect and recover from deadlocks as described above. For example, deadlock detectors are described in each of the following U.S. Pat. No. 5,095,421 (Freund, Mar. 10, 1992), U.S. Pat. No. 5,845,117 (Fujita, Dec. 1, 1998), U.S. Pat. No. 5,459,871 (Van Den Berg, Oct. 17, 1995), U.S. Pat. No. 5,440,743 (Yokota, Aug. 8, 1995), and U.S. Pat. No. 5,682,537 (Davies et al., Oct. 28, 1997). In U.S. Pat. No. 5,832,484 (Sankaran et al., Nov. 3, 1998), a deadlock detector and a method to avoid potential deadlock detection by deferring the deadlock detection steps is described. These prior art methods are generally concerned with systems that do not include a demultiplexing component for the processes which seek to acquire locks on resources.

In a demultiplexed connection DBMS, where there are worker agents assigned to applications, it is possible for an application to become inactive but to retain locks on portions of the database. In this case, the application will be disassociated from a worker agent and yet the application may retain locks on data in the DBMS. Where this occurs, and where both the inactive application is unable to acquire a worker agent and other applications are waiting for the inactive application to relinquish its lock, it is possible to have deadlocks in the DBMS.

In the prior art it is known that such deadlocks may occur in a DBMS and users of such systems must restart the system and make modifications to the number of worker agents available to permit processing in the database to continue. Such a disruption to the database system is undesirable where the database is required to be continually available.

It is therefore desirable to provide a computer system for the detection and management of deadlocks in a demultiplexed connection environment DBMS.

SUMMARY OF THE INVENTION

A system and method for managing deadlocks in a database management system (DBMS) for a demultiplexed database system having worker agents and applications associated with, and disassociated from, the worker agents is disclosed. The DBMS of the present invention supports applications that are capable of holding and retaining locks on database resources while disassociated from worker agents. The system and method of the present invention includes an application scheduler for managing requests for access to the database, and a deadlock detector for identifying a deadlock According to one embodiment of the present invention, the application scheduler assigns one worker agent to an application requesting access to a database resource, assigns a flag to an application holding a lock on the database resource while disassociated from a worker agent, and in cooperation with the deadlock detector, resolves the deadlock between the application requesting access and the flagged application holding the lock.

According to another aspect of the present invention, there is provided a deadlock management system for a database system, the database system including a set of applications selectively requesting and holding locks on database resources, a pool of worker agents including normal worker agents and overflow worker agents, an application scheduler, a wait queue, a priority queue, and a deadlock detector, the database system supporting an application holding a lock while disassociated from a worker agent, the deadlock management system including:

means for marking an application with a flag value based on the existing application flag value and on the state of applications requesting and holding locks on database resources, including, means for marking an application with a flag value W where the application becomes disassociated from a worker agent, means for marking an application with a flag value H where the application has a flag value W and where the application holds a lock on a database resource requested by another application, means for marking an application with a flag value D where the application requests a worker agent, has a flag value H and there is no normal worker agent or overflow worker agent available for the application, means for marking an application with the flag value Q where the application has a flag value W and a worker agent is not available, wherein the application is placed on the wait queue, and means for marking an application with the flag value D where the application has the flag value Q and a worker agent associated with another application requests a lock held by the application having the flag value Q, means for the application scheduler to respond to an application request for a worker agent and to selectively provide a normal worker agent, an overflow worker agent, or place the application on the wait queue or on the priority queue, based on the application flag value, including means for responding to a request for a worker agent from an application with flag value H by obtaining a normal worker agent if available and alternatively providing an overflow worker agent, further including means for placing the application on the priority queue where no overflow worker agent is available, and means for responding to a request for a worker agent from an application with flag value W by obtaining a normal worker agent if available and alternatively by placing the application on the wait queue, means for clearing the application flag value when an application is provided with a worker agent, means for the deadlock detector to poll an application and means for the deadlock detector to declare a deadlock where the application has a specified flag value and the application holds a lock on a database resource requested by another application, including, means for declaring a deadlock where an application has a flag value D and the application holds a lock on a database resource that is requested by another application, the deadlock detector further including a lock wait deadlock graph and a resource representation, the lock wait deadlock graph including means to represent applications requesting and holding locks on database resources whereby the deadlock detector determines if an application holds a lock requested by another application, and means for selecting an application holding a lock and for requiring the application to release the lock, following detection of a deadlock on the lock.

According to another aspect of the present invention, there is provided a method of deadlock management for a database system, the database system including a set of applications selectively requesting and holding locks on database resources, a pool of worker agents including normal worker agents and overflow worker agents, a wait queue, and a priority queue, the database system supporting an application holding a lock while disassociated from a worker agent, the method of deadlock management including the steps of:

1. marking an application with a flag value based on the existing application flag value and on the state of applications requesting and holding locks on database resources, including the steps of:

i) marking an application with a flag value W where the application becomes disassociated from a worker agent, ii) marking an application with a flag value H where the application has a flag value W and where the application holds a lock on a database resource requested by another application, iii) marking an application with a flag value D where the application requests a worker agent, has a flag value H and there is no normal worker agent or overflow worker agent available for the application, iv) marking an application with the flag value Q where the application has a flag value W and a worker agent is not available, wherein the application is placed on the wait queue, and v) marking an application with the flag value D where the application has the flag value Q and a worker agent associated with another application requests a lock held by the application having the flag value Q, 2. responding to an application request for a worker agent from the pool and selectively providing a normal worker agent, an overflow worker agent, or placing the application on the wait queue or on the priority queue, based on the application flag value, including the steps of:

i) responding to a request for a worker agent from an application with flag value H by obtaining a normal worker agent if available and alternatively by providing an overflow worker agent, further including the step of placing the application on the priority queue where no overflow worker agent is available, and ii) responding to a request for a worker agent from an application with flag value W by obtaining a normal worker agent if available and alternatively by placing the application on the wait queue, 3. clearing the application flag value when an application is provided with a worker agent, 4. polling an application and declaring a deadlock where the application has a specified flag value and the application holds a lock on a database resource requested by another application, including the step of declaring a deadlock where an application has a flag value D and the application holds a lock on a database resource that is requested by another application, the database system further including a lock wait deadlock graph and a resource representation, the lock wait deadlock graph including means to represent applications requesting and holding locks on database resources whereby the step of declaring a deadlock comprises the step of determining if an application holds a lock requested by another application by accessing the lock wait graph, and 5. selecting an application holding a lock and requiring the application to release the lock, following detection of a deadlock on the lock.

According to another aspect of the present invention, there is provided a computer program product for deadlock management in a database system, the computer program product including a computer usable medium having computer readable code means embodied in the medium, including computer readable program code means for carrying out the above method.

Advantages of the present invention include the improved detection and management of deadlocks in DBMSs and include detection and elimination of a deadlock without requiring the DBMS to become unavailable to users.

BRIEF DESCRIPTION OF THE DRAWINGS

The preferred embodiment of the invention is shown in the drawings, wherein.

Figure 1:
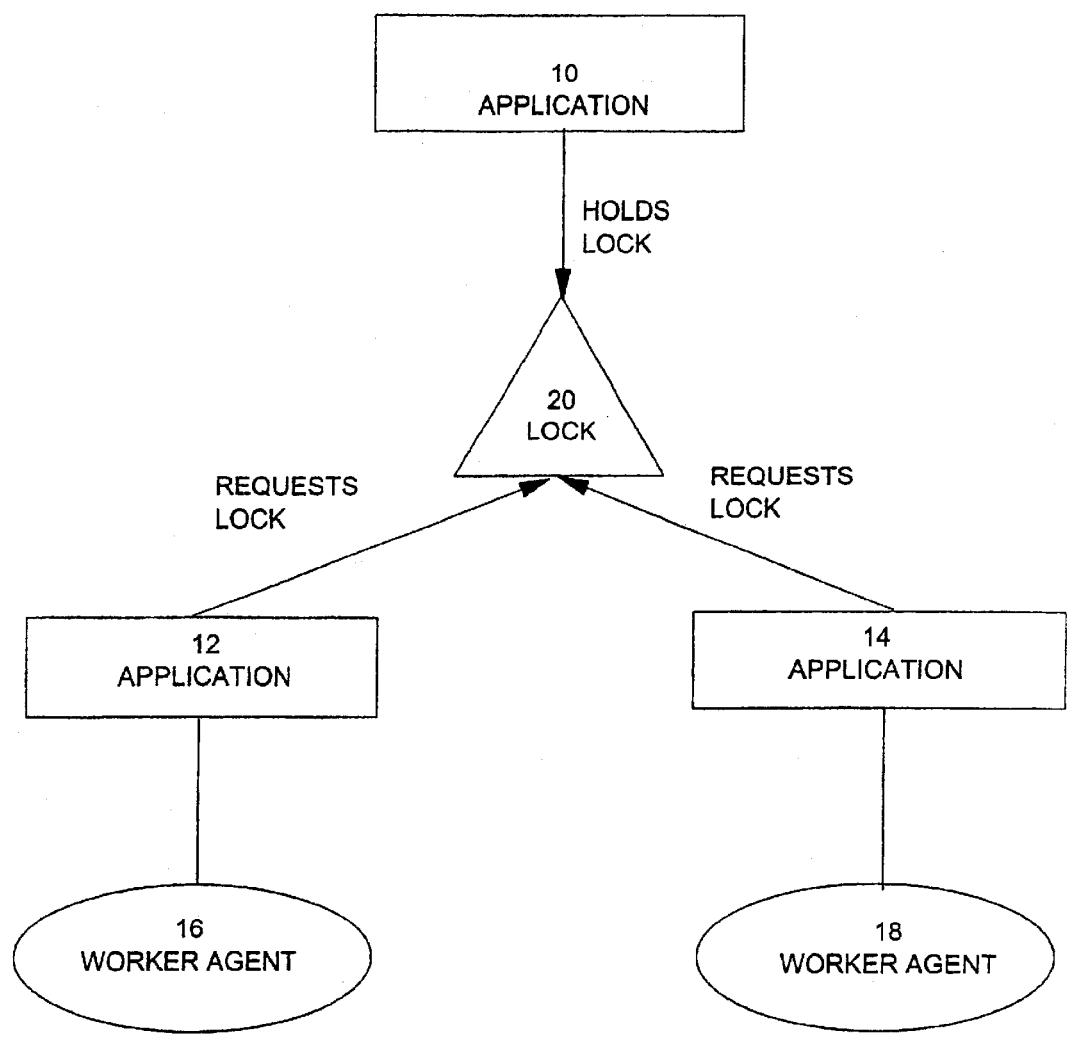
FIG. 1 is a block diagram illustrating how a deadlock may occur in a demultipexed connection DBMS.

In the drawings, the preferred embodiment of the invention is illustrated by way of example. It is to be expressly understood that the description and drawings are only for the purpose of illustration and as an aid understanding, and are not intended as a definition of the limits of the invention.

DETAILED DESCRIPTION OF THE PREFERRED EMBODIMENT

Figure 2:
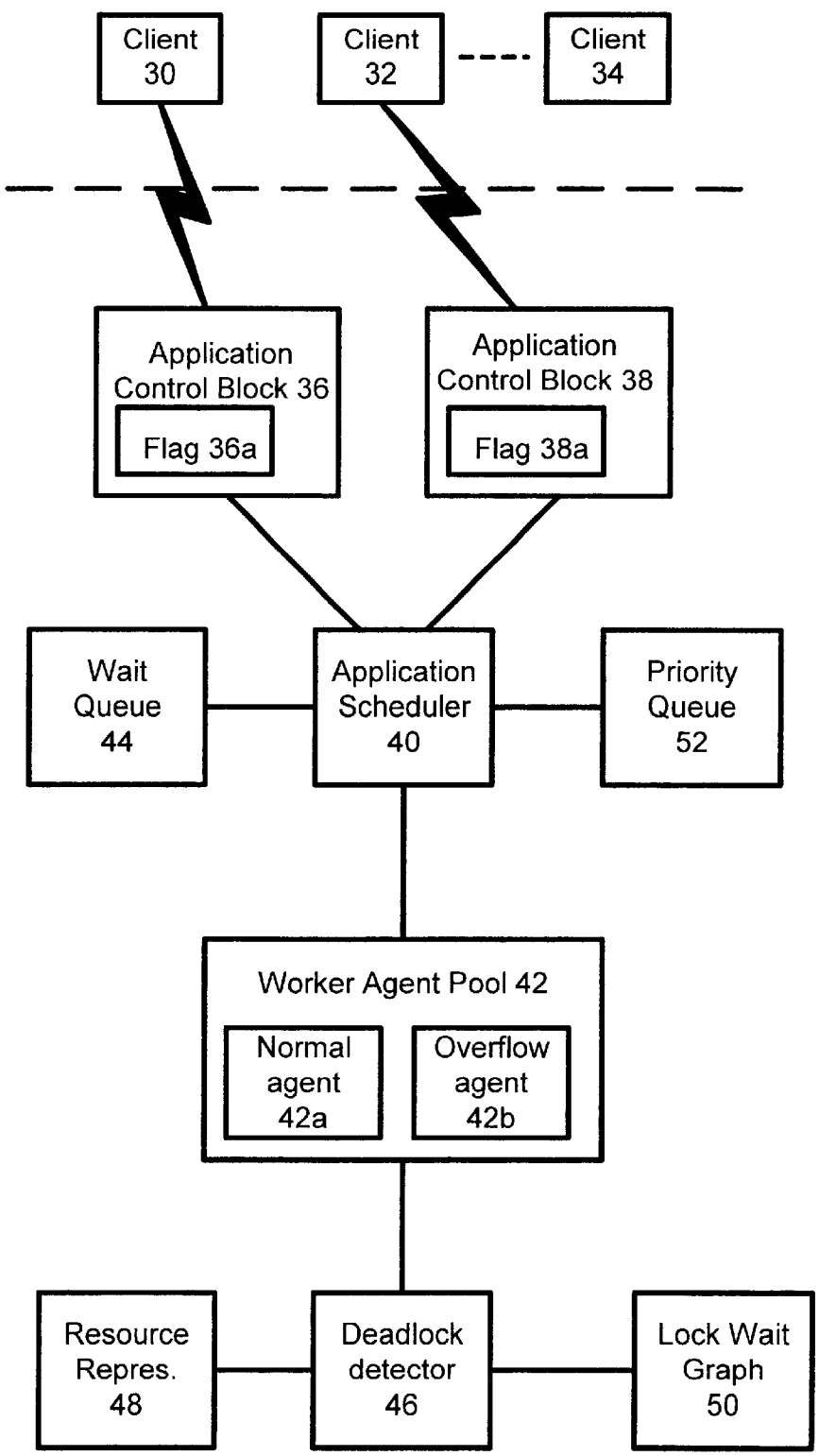
FIG. 2 is a block diagram illustrating a portion of the architecture of a DBMS in accordance with the preferred embodiment.

FIG. 1 shows, in a block diagram, an arrangement of applications 10, 12, 14, worker agents 16, 18 and lock 20 which may result in deadlock in a database system. FIG. 2 shows, in a block diagram, components of the demultiplexed database of the preferred embodiment. The example of FIG. 2 shows clients 30, 32, 34. Clients run applications that access the database using the DBMS. Within the DBMS of the preferred embodiment, clients are associated with application control blocks or logical agents. In the example of FIG. 2, application control blocks 36, 38 are shown associated with clients 30, 32, respectively. The demultiplexed database system of the preferred embodiment also includes worker agents (sometimes referred to as physical agents). These are tasks or processes which carry out the data retrieval or modification as required by the clients, or applications. In FIG. 1 worker agents 16, 18 are shown.

In database systems it is common to provide locks on portions of the data. The granularity of the lock may vary from a table to an attribute in a row of a table. Database systems typically associate applications with worker agents on a transactional basis. Worker agents are reassigned to applications on transaction boundaries. However, in certain database systems it is possible to maintain locks on data across a transaction boundary. For example the WITHHOLD CURSOR command in DB2 UDB (trade-mark) permits an application to keep a cursor open between transactions. In this case, a lock may be maintained by the application after it is disassociated from its worker agent.

The example of FIG. 1 shows application 10 holding lock 20. In this example, application 10 is shown without an associated worker agent. Applications 12, 14 each have associated worker agents (worker agent 16, 18). Where application 12 and application 14 each request lock 20 and there is no worker agent available for application 10, a deadlock will ensue. Application 10 is unable to obtain a worker agent because the transactions of applications 12, 14 are not complete. Those applications cannot complete their transactions because lock 20 is unavailable. In the prior art, once such a deadlock occurred it was necessary to interrupt the processing of the DBMS and increase the number of available worker agents to avoid the deadlock.

FIG. 2 shows, in a block diagram format, an example architecture of a DBMS including the deadlock detection and management of the preferred embodiment. FIG. 2 shows clients 30, 32, 34 and application control blocks 36, 38. Application scheduler 40 provides access to worker agents maintained in worker agent pool 42. Where application scheduler 40 is unable to obtain a free worker agent from worker agent pool 42 the application control block seeking access to a worker agent is placed on wait queue 44. Also shown in FIG. 2 is deadlock detector 46 which accesses resource representation 48 and lock wait graph 50 to carry out deadlock detection. Lock wait graph 50 is directed graph representing applications and locks in the DBMS. When an application requests or is granted a lock the graph is updated to show the application and the lock it is waiting on or holds.

In the system of the preferred embodiment a deadlock detector process is associated with each database in the DBMS. The deadlock detector polls application control blocks and makes decisions regarding deadlocks. In the system of the preferred embodiment worker agent pool 42 includes a set overflow worker agents. These are worker agents that are intended to be used where a potential deadlock has been identified. In addition to wait queue 44 a priority queue 52 maintains a list of applications to be provided priority access to worker agent pool 42 and to the overflow worker agents within that pool. The details of worker agent allocation are understood by those skilled in the art.

Deadlock detector 46 has associated resource representation 48 and lock wait graph 50. These maintain information about system resources and applications waiting on those resources. Lock wait graph 50 includes data indicating which applications are waiting on locks.

Figure 3:
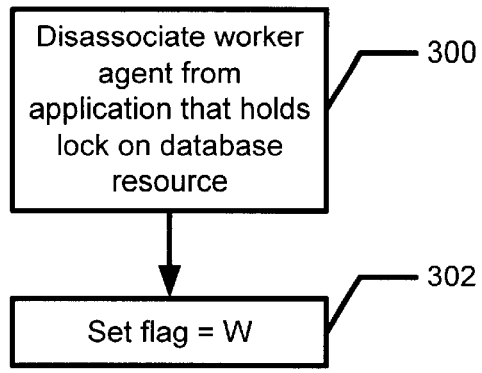
FIGS. 3, 4, 5 and 6 are flowcharts illustrating the process for managing requests for access to database resources according to a preferred embodiment of the present invention.

FIGS. 3, 4, 5 and 6 are flowcharts illustrating the process for managing requests for access to database resources according to a preferred embodiment of the present invention. As mentioned above, each application control block 36, 38 has an associated flag 36a, 38a, used in deadlock detection. The flags 36a, 38a associated with applications 36, 38 are set in the following manner:

1. Referring to FIG. 3, when an application control block. e.g., 10 (FIG. 1) becomes disassociated from a worker agent. e.g., 16, but the application 10 maintains a lock 20 on data (for example by use of a WITHHOLD CURSOR command) (step 300), the application is marked with flag W (step 302).

Figure 4:
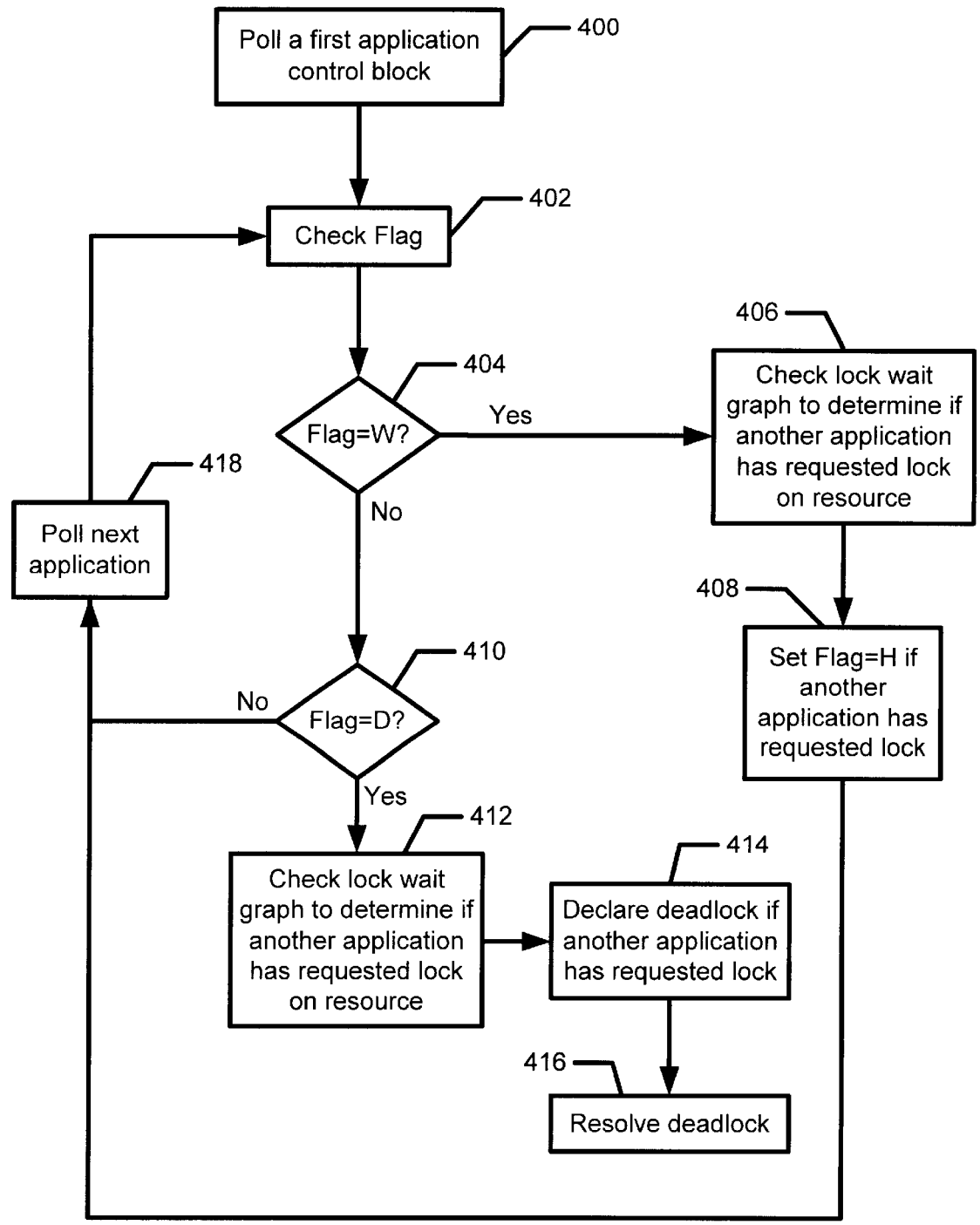

2. Referring to FIG. 4, when deadlock detector 46 polls an application control block 36 (step 400) having a flag W 36a (step 404) and determines that the application holds a lock that is required by another application (step 406), the first application is marked with flag H (step 408).

Figure 5:
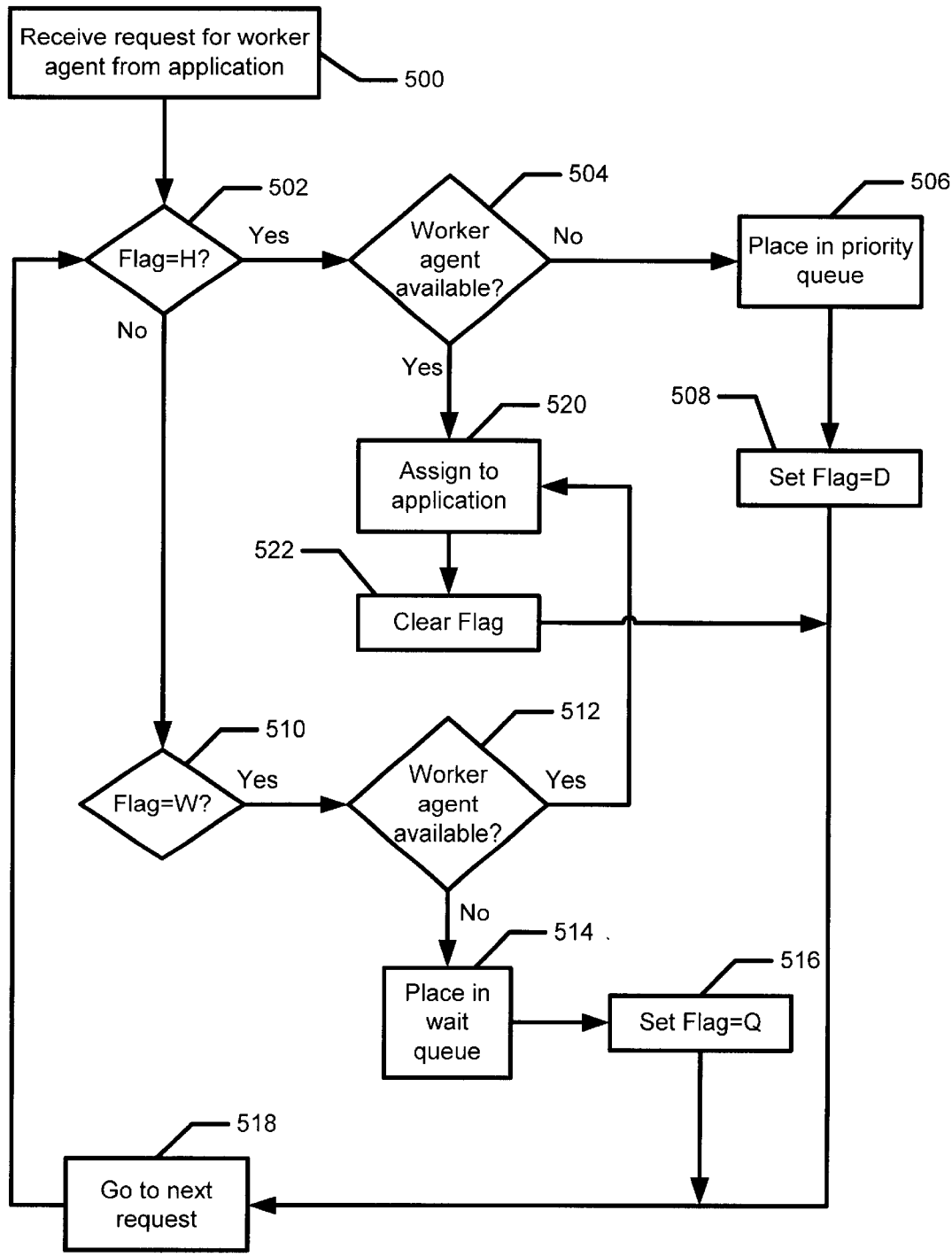

3. Referring to FIG. 5, when application scheduler 40 is subject to a request for a worker agent 42 (step 500) and the application 36 making the request has a flag H 36a (step 502), application scheduler 40 will attempt to locate a worker agent 42a in worker agent pool 42. If there is no such worker agent available, application scheduler 40 will seek to obtain an overflow worker agent 42b from worker agent pool 42. If no overflow worker agent 42b is available (step 504) application scheduler 40 will put the application 36 into priority queue 52 (step 506) and mark the application 36 with flag D 36a (step 508).

4. When a request is made to application scheduler 40 (step 500) from an application control block 38 with flag W 38a (step 510) and there is no worker agent 42a in worker agent pool 42 to serve the application (step 512), the application 38 is placed on wait queue 44 (step 514) and marked with flag Q (step 516).

Figure 6:
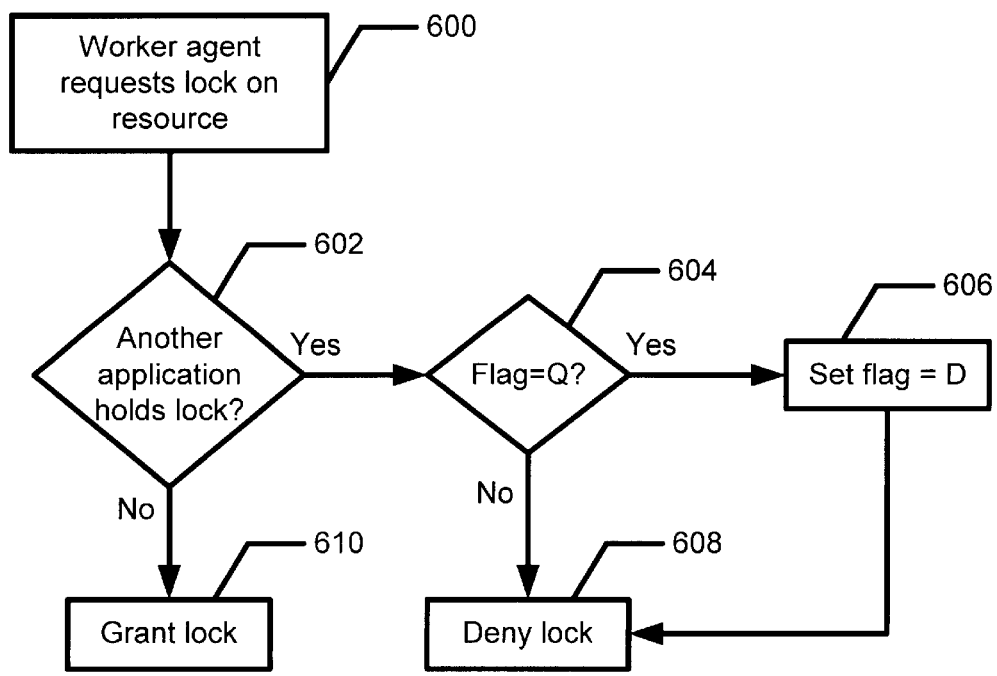

5. Referring to FIG. 6, when a worker agent 42a associated with an application 36 requests a lock for the application 36 (step 600) and determines that the lock is held by another application, e.g., 38, (step 602) marked with flag Q 38a (step 604), the worker agent 42a changes the flag Q 38a to a flag D (step 606).

6. Referring again to FIG. 4, when deadlock detector 46 polls an application control block 38 (step 400) and the application has flag D 38a (step 410), deadlock detector 46 will determine from lock wait graph 50 whether the application 38 holds a lock required by another application, e.g., 36 (step 412). If this condition is found, deadlock detector 46 declares a deadlock (step 414).

7. Referring again to FIG. 5, when an application 36 becomes associated with a worker agent 42a from worker agent pool 42 by application scheduler 40 (step 520), the flag 36a for the application 36 is cleared (step 522).

By placing applications on priority queue 52 or by associating applications with overflow worker agents it is possible to reduce the number of deadlocks that might otherwise occur. Where the deadlock state is not avoided, the deadlock detector 46 is able to select a transaction from worker agent pool 42 and rollback that transaction to free up a worker agent so that the deadlock condition is no longer present. This rollback of a single transaction will resolve the deadlock state in the database and permit processing to continue, without requiring that the database processing be otherwise interrupted.

Considering the operation of the preferred embodiment with respect to the example in FIG. 1, if application 10 in FIG. 1 becomes disassociated from a worker agent but maintains a lock (for example where there is an open withhold cursor) the flag for application 10 is set to W. If application 10 then makes a request for a worker agent and there is no worker agent available, application 10 will be placed on wait queue 44 and have its flag set to Q. If application 12 then requests lock 20, held by application 10, application 10 will have its flag set to D. Deadlock detector 46, when polling application 10 will then find flag D and determine from lock wait graph 50 that application 12 is seeking lock 20 now held by application 10. A deadlock state will be declared by deadlock detector 46.

Another possible scenario is for application 10 to hold lock 20 and be disassociated from a worker agent resulting in application 10 having flag W. Before application 10 requests a worker agent, application 12 may request 20. At this point application 10 is given flag H. If application 10 requests a worker agent and there is no worker agent 42a available, application scheduler 40 will seek to make available an overflow worker agent 42b. If there is no overflow worker agent 42b available in worker agent pool 42, application 10 will be placed on priority queue 52. Where another application such as application 14 requests lock 20, flag for application 10 will be changed to flag D. By making available an overflow worker agent 42b, and by placing application 10 in priority queue 52, the DBMS seeks to avoid a deadlock. Where such a deadlock is unavoidable (no overflow agent is freed up before application 14 requests lock 20), the deadlock detector will declare a deadlock and will rollback a transaction to resolve the deadlock state.

Although a preferred embodiment of the present invention has been described here in detail, it will be appreciated by those skilled in the art that variations may be made thereto without departing from the spirit of the invention or the scope of the appended claims.

What is claimed is:

1. A method for managing requests for access to database resources in a database system, the database system comprising a plurality of applications capable of requesting access to a plurality of database resources and capable of holding locks on the plurality of database resources, and the database system further comprising an application scheduler for managing requests from the plurality of applications for access to database resources, the method comprising the steps of:

a) assigning a worker agent from a plurality of worker agents to an application by the application scheduler;
   b) identifying a deadlock via a deadlock detector coupled to the application scheduler, the deadlock being between an application disassociated from the worker agent while holding a lock on a database resource and another application requesting access to the database resource; and
   c) resolving the deadlock.

2. The method of claim 1, wherein the plurality of worker agents includes normal worker agents and overflow worker agents, and assigning step a) further includes:

(a1) marking an application with a flag value based on an existing application flag value and on a state of applications requesting and holding locks on database resources,
   (a2) assigning a normal worker agent or an overflow worker agent to the application, or placing the application on a wait queue or on a priority queue, based on the application flag value.

3. The method of claim 2, wherein identifying step (b) further includes:

(b1) polling an application; and
   (b2) declaring a deadlock where the application has a specified flag value and the application holds a lock on a database resource requested by another application.

4. The method of claim 3, wherein the marking step (a1) comprising the steps of:

marking an application with a flag value W where the application becomes disassociated from a worker agent and holds a lock on a database resource;
   marking an application with a flag value H where the application has a flag value W and the database resource is requested by another application;
   marking an application with a flag value D where the application requests a worker agent, has a flag value H and there a normal worker agent or overflow worker agent is not available for the application;
   marking an application with the flag value Q where the application has the flag value W and a normal worker agent is not available upon request, wherein the application is placed on a wait queue, and
   marking an application with the flag value D where the application has the flag value Q and another application requests a lock held by the application having the flag value Q.

5. The method of claim 4, wherein assigning step (a2) comprising the steps of:

providing a normal worker agent if available to an application with flag value H and alternatively providing an overflow worker agent, and if normal worker agent and overflow worker agent are not available, placing the application on the priority queue, and
   providing a normal worker agent to an application with flag value W and alternatively placing the application on the wait queue if a normal worker agent is not available.

6. The method of claim 5, wherein the declaring step (b2) comprises the step of declaring a deadlock wherein the specified flag value is D.

7. The method of claim 5, wherein the declaring step (b2) comprising:

using a lock wait deadlock graph and a resource representation, the lock wait deadlock graph comprising means to represent applications requesting and holding locks on database resources.

8. The method of claim 7, wherein the resolving step (c) comprising the step of selecting an application holding a lock and requiring the application to release the lock, following detection of a deadlock on the lock.

9. The method of claim 8, further comprising the step:

(d) clearing the application flag value when an application is provided a worker agent.

10. A database management system (DBMS), wherein the DBMS includes a plurality of applications capable of requesting access to a plurality of database resources and capable of holding locks on the plurality of database resources, and an application scheduler for managing requests from the plurality of applications for access to database resources, the DBMS further comprising:

a plurality of worker agents, the plurality of worker agents including a plurality of normal worker agents and overflow worker agents; and
   a deadlock detector coupled to the application scheduler for identifying a deadlock;
   wherein the application scheduler assigns one worker agent to an application requesting access to a database resource, assigns a flag to an application holding a lock on the database resource while disassociated from a worker agent, and in cooperation with the deadlock detector, resolves the deadlock between the application requesting access and the flagged application holding the lock.

11. The system of claim 10, further comprising:

means for marking an application with a flag value based on the existing application flag value and on the state of applications requesting and holding locks on database resources;

means for the application scheduler to respond to the application requesting access and to selectively assign a normal worker agent, an overflow worker agent, or place the application on a wait queue or on a priority queue, based on the application flag value; and means for clearing the application flag value when an application is provided with a worker agent.

12. The system of claim 11, wherein the deadlock detector further includes:

means for polling an application and means for declaring a deadlock where the application has a specified flag value, and the application holds a lock on a database resource requested by another application.

13. The system of claim 12, wherein the means for marking an application comprises:

means for marking an application with a flag value W where the application becomes disassociated from a worker agent and holds a lock on a database resource;

means for marking an application with a flag value H where the application has a flag value W and where another application requests access to the locked database resource;

means for marking an application with a flag value D where the application requests a worker agent, has a flag value H and a normal worker agent or overflow worker agent is not available for the application;

means for marking an application with the flag value Q where the application has the flag value W and a normal worker agent is not available upon request, wherein the application is placed on the wait queue; and means for marking an application with the flag value D where the application has the flag value Q and another application requests a lock held by the application having the flag value Q.

14. The system of claim 13, wherein the means for the application scheduler responding to an application requesting access comprises:

means for responding to a request for a worker agent from an application with flag value H by obtaining a normal worker agent if available and alternatively providing an overflow worker agent, further comprising means for placing the application on the priority queue where no overflow worker agent is available; and means for responding to a request for a worker agent from an application with flag value W by obtaining a normal worker agent if available and alternatively by placing the application on the wait queue.

15. The system of claim 14, wherein the deadlock detector comprises means for declaring a deadlock where an application has a flag value D and the application holds a lock on a database resource that is requested by another application.

16. The system of claim 15, wherein the deadlock detector further comprises a lock wait deadlock graph and a resource representation, the lock wait deadlock graph comprising means to represent applications requesting and holding locks on database resources, whereby the deadlock detector determines if an application holds a lock requested by another application.

17. The system of claim 16, further comprising means for selecting an application holding a lock and requiring the application to release the lock, following detection of a deadlock on the lock.

18. A computer readable medium containing program instructions for managing requests for access to database resources in a database system, the database system comprising a plurality of applications capable of requesting access to a plurality of database resources and capable of holding locks on the plurality of database resources, the database system further comprising an application scheduler for managing requests from the plurality of applications for access to the plurality of database resources, the program instructions for:

a) assigning a worker agent from a plurality of worker agents to an application by the application scheduler;

b) identifying a deadlock via a deadlock detector coupled to the application scheduler, the deadlock being between an application disassociated from the worker agent while holding a lock on a database resource and another application requesting access to the database resource; and c) resolving the deadlock.

19. The computer readable medium of claim 18, wherein the plurality of worker agents includes normal worker agents and overflow worker agents, and assigning instruction a) further includes:

(a1) marking an application with a flag value based on an existing application flag value and on a state of applications requesting and holding locks on database resources, and (a2) assigning a normal worker agent or an overflow worker agent to the application, or placing the application on a wait queue or on a priority queue, based on the application flag value.

20. The computer readable medium of claim 19, wherein identifying instruction (b) further includes:

(b1) polling an application; and (b2) declaring a deadlock where the application has a specified flag value and the application holds a lock on a database resource requested by another application.

21. The computer readable medium of claim 20, wherein the marking instruction (a1) comprising the instructions for:

marking an application with a flag value W where the application becomes disassociated from a worker agent and holds a lock on a database resource;

marking an application with a flag value H where the application has a flag value W and the database resource is requested by another application;

marking an application with a flag value D where the application requests a worker agent, has a flag value H and there a normal worker agent or overflow worker agent is not available for the application;

marking an application with the flag value Q where the application has the flag value W and a normal worker agent is not available upon request, wherein the application is placed on a wait queue, and marking an application with the flag value D where the application has the flag value Q and another application requests a lock held by the application having the flag value Q.

22. The computer readable medium of claim 21, wherein assigning instruction (a2) comprising the instructions for:

providing a normal worker agent if available to an application with flag value H and alternatively providing an overflow worker agent, and if normal worker agent and overflow worker agent are not available, placing the application on the priority queue, and providing a normal worker agent to an application with flag value W and alternatively placing the application on the wait queue if a normal worker agent is not available.

23. The computer readable medium of claim 22, wherein the declaring instruction (b2) comprises the instruction of declaring a deadlock wherein the specified flag value is D.

24. The computer readable medium of claim 22, wherein the declaring instruction (b2) comprising:

using a lock wait deadlock graph and a resource representation, the lock wait deadlock graph comprising means to represent applications requesting and holding locks on database resources.

25. The computer readable medium of claim 24, wherein the resolving instruction (c) comprising the instruction of selecting an application holding a lock and requiring the application to release the lock, following detection of a deadlock on the lock.

26. The computer readable medium of claim 19, further comprising an instruction for:

(d) clearing the application flag value when an application is provided a worker agent.

27. A method of deadlock management for a database system, the database system comprising a set of applications selectively requesting and holding locks on database resources, a pool of worker agents comprising normal worker agents and overflow worker agents, a wait queue, and a priority queue, the method comprising the steps of:

marking an application with a flag value based on an existing application flag value and on a state of applications requesting and holding locks on database resources, comprising the steps of:

marking an application with a flag value W where the application becomes disassociated from a worker agent and holds a lock on a database resource;

marking an application with a flag value H where the application has a flag value W and where another application requests a lock on the database resource;

marking an application with a flag value D where the application requests a worker agent, has a flag value H and there a normal worker agent or overflow worker agent is not available for the application;

marking an application with the flag value Q where the application has a flag value W and a normal worker agent is not available upon request, the application being placed on the wait queue, and marking an application with the flag value D where the application has the flag value Q and another application requests a lock held by the application having the flag value Q;

responding to an application request for a worker agent and selectively providing a normal worker agent, an overflow worker agent, or placing the application on the wait queue or on the priority queue, based on the application flag value, comprising the steps of:

responding to a request for a worker agent from an application with flag value H by obtaining a normal worker agent if available and alternatively by providing an overflow worker agent, further comprising the step of placing the application on the priority queue where an overflow worker agent is not available, and responding to a request for a worker agent from an application with flag value W by obtaining a normal worker agent if available and alternatively by placing the application on the wait queue;

clearing the application flag value when an application is provided with a worker agent;

polling an application and declaring a deadlock where the application has a specified flag value and the application holds a lock on a database resource requested by another application, comprising the step of declaring a deadlock where an application has a flag value D and the application holds a lock on a database resource that is requested by another application, the database system further comprising a lock wait deadlock graph and a resource representation, the lock wait deadlock graph comprising means to represent applications requesting and holding locks on database resources whereby the step of declaring a deadlock comprises the step of determining if an application holds a lock requested by another application by accessing the lock wait graph, and selecting an application holding a lock and requiring the application to release the lock, following detection of a deadlock on the lock.

28. A deadlock management system for a database system, the database system comprising a set of applications selectively requesting and holding locks on database resources, a pool of worker agents comprising normal worker agents and overflow worker agents, an application scheduler, a wait queue, a priority queue, and a deadlock detector, the database system supporting an application holding a lock while disassociated from a worker agent, the deadlock management system comprising:

means for marking an application with a flag value based on an existing application flag value and on a state of applications requesting and holding locks on database resources, comprising;

means for marking an application with a flag value W where the application becomes disassociated from a worker agent and holds a lock on a database resource;

means for marking an application with a flag value H where the application has a flag value W and where the database resource is requested by another application;

means for marking an application with a flag value D where the application requests a worker agent, has a flag value H and a normal worker agent or overflow worker agent is not available for the application;

means for marking an application with the flag value Q where the application has a flag value W and a normal worker agent is not available upon request, wherein the application is placed on the wait queue; and means for marking an application with the flag value D where the application has the flag value Q and another application requests a lock held by the application having the flag value Q;

means for the application scheduler to respond to an application request for a worker agent from the pool and to selectively provide a normal worker agent, an overflow worker agent, or place the application on the wait queue or on the priority queue, based on the application flag value, comprising:

means for responding to a request for a worker agent from an application with flag value H by obtaining a normal worker agent if available and alternatively providing an overflow worker agent, further comprising means for placing the application on the priority queue where an overflow worker agent is not available; and means for responding to a request for a worker agent from an application with flag value W by obtaining a normal worker agent if available and alternatively by placing the application on the wait queue;

means for clearing the application flag value when an application is provided with a worker agent, means for the deadlock detector to poll an application; and means for the deadlock detector to declare a deadlock where the application has a specified flag value and the application holds a lock on a database resource requested by another application; comprising:

means for declaring a deadlock where an application has a flag value D and the application holds a lock on a database resource that is requested by another application, the deadlock detector further comprising a lock wait deadlock graph and a resource representation, the lock wait deadlock graph comprising means to represent applications requesting and holding locks on database resources whereby the deadlock detector determines if an application holds a lock requested by another application; and means to select an application holding a lock and to require the application to release the lock, following detection of a deadlock on the lock.

29. A method for managing requests for access to database resources in a database system, the database system comprising a plurality of applications capable of requesting access to a plurality of database resources and capable of holding locks on the plurality of database resources, and the database system further comprising an application scheduler for managing requests from the plurality of applications for access to database resources, the method comprising the steps of:

a) assigning a worker agent from a plurality of worker agents to an application by the application scheduler, wherein the plurality of worker agents includes normal worker agents and overflow worker agents, and assigning step a) further includes:

(a1) marking an application with a flag value based on an existing application flag value and on a state of applications requesting and holding locks on database resources, wherein the marking step includes:

marking an application with a flag value W where the application becomes disassociated from a worker agent and holds a lock on a database resource;

marking an application with a flag value H where the application has a flag value W and the database resource is requested by another application;

marking an application with a flag value D where the application requests a worker agent, has a flag value H and there a normal worker agent or overflow worker agent is not available for the application;

marking an application with the flag value Q where the application has the flag value W and a normal worker agent is not available upon request, wherein the application is placed on a wait queue, and marking an application with the flag value D where the application has the flag value Q and another application requests a lock held by the application having the flag value Q; and (a2) assigning a normal worker agent or an overflow worker agent to the application, or placing the application on a wait queue or on a priority queue, based on the application flag value;

b) identifying a deadlock via a deadlock detector coupled to the application scheduler, the deadlock being between an application disassociated from the worker agent while holding a lock on a database resource and another application requesting access to the database resource, wherein identifying step (b) further includes:

(b1) polling an application; and (b2) declaring a deadlock where the application has a specified flag value and the application holds a lock on a database resource requested by another application; and c) resolving the deadlock.

30. A database management system (DBMS), wherein the DBMS includes a plurality of applications capable of requesting access to a plurality of database resources and capable of holding locks on the plurality of database resources, and an application scheduler for managing requests from the plurality of applications for access to database resources, the DBMS further comprising:

a plurality of worker agents, the plurality of worker agents including a plurality of normal worker agents and overflow worker agents;

a deadlock detector coupled to the application scheduler for identifying a deadlock;

wherein the application scheduler assigns one worker agent to an application requesting access to a database resource, assigns a flag to an application holding a lock on the database resource while disassociated from a worker agent, and in cooperation with the deadlock detector, resolves the deadlock between the application requesting access and the flagged application holding the lock;

means for marking an application with a flag value based on the existing application flag value and on the state of applications requesting and holding locks on database resources;

means for the application scheduler to respond to the application requesting access and to selectively assign a normal worker agent, an overflow worker agent, or place the application on a wait queue or on a priority queue, based on the application flag value;

means for clearing the application flag value when an application is provided with a worker agent;

wherein the deadlock detector further includes:

means for polling an application and means for declaring a deadlock where the application has a specified flag value, and the application holds a lock on a database resource requested by another application; and wherein the means for marking an application comprises:

means for marking an application with a flag value W where the application becomes disassociated from a worker agent and holds a lock on a database resource:

means for marking an application with a flag value H where the application has a flag value W and where another application requests access to the locked database resource;

means for marking an application with a flag value D where the application requests a worker agent, has a flag value H and a normal worker agent or overflow worker agent is not available for the application;

means for marking an application with the flag value Q where the application has the flag value W and a normal worker agent is not available upon request, wherein the application is placed on the wait queue; and means for marking an application with the flag value D where the application has the flag value Q and another application requests a lock held by the application having the flag value Q.

31. A computer readable medium containing program instructions for managing requests for access to database resources in a database system, the database system comprising a plurality of applications capable of requesting access to a plurality of database resources and capable of holding locks on the plurality of database resources, the database system further comprising an application scheduler for managing requests from the plurality of applications for access to the plurality of database resources, the program instructions for:

a) assigning a worker agent from a plurality of worker agents to an application by the application scheduler, wherein the plurality of worker agents includes normal worker agents and overflow worker agents, and assigning instruction a) further includes:

(a1) marking an application with a flag value based on an existing application flag value and on a state of applications requesting and holding locks on database resources, wherein the marking instruction (a1) comprising the instructions for:

marking an application with a flag value W where the application becomes disassociated from a worker agent and holds a lock on a database resource;

marking an application with a flag value H where the application has a flag value W and the database resource is requested by another application;

marking an application with a flag value D where the application requests a worker agent, has a flag value H and there a normal worker agent or overflow worker agent is not available for the application;

marking an application with the flag value Q where the application has the flag value W and a normal worker agent is not available upon request, wherein the application is placed on a wait queue, and marking an application with the flag value D where the application has the flag value Q and another application requests a lock held by the application having the flag value Q; and (a2) assigning a normal worker agent or an overflow worker agent to the application, or placing the application on a wait queue or on a priority queue, based on the application flag value;

b) identifying a deadlock via a deadlock detector coupled to the application scheduler, the deadlock being between an application disassociated from the worker agent while holding a lock on a database resource and another application requesting access to the database resource, wherein identifying instruction (b) further includes:

(b1) polling an application; and (b2) declaring a deadlock where the application has a specified flag value and the application holds a lock on a database resource requested by another application; and c) resolving the deadlock.

* * * * *